United States Patent [19]

Greenhow

[11] Patent Number: 4,669,267

[45] Date of Patent: Jun. 2, 1987

[54] HYDROSTATIC HYDRAULIC TRANSMISSION

[76] Inventor: David Greenhow, 1 Sandringham Avenue, Hamilton, Ontario, Canada, L9C 2H3

[21] Appl. No.: 863,337

[22] Filed: May 15, 1986

[51] Int. Cl.⁴ ............................................. F16D 39/00
[52] U.S. Cl. ........................................................ 60/490
[58] Field of Search ..................................... 60/489, 490

[56] References Cited

U.S. PATENT DOCUMENTS 2,570,843 10/1951 Orshansky, Jr. ...................... 60/489
2,907,230 10/1959 Kollmann ........................... 60/489 X Primary Examiner—Allen M. Ostrager
Attorney, Agent, or Firm—Sim & McBurney

[57] ABSTRACT

A hydrostatic hydraulic transmission has a casing which is connected to rotate together with an output shaft, and also has an input shaft. A pump includes a cylinder block, pistons reciprocable in the block, a valve plate, a swash plate and a yoke for the swash plate, the swash plate, the yoke and a valve plate being constrained to rotate together with the casing. The cylinder block is constrained to rotate with the input shaft. A motor has a cylinder block, pistons reciprocable in the block, a valve plate, a swash plate and a yoke for the swash plate, the swash plate, the yoke of the motor and the valve plate of the motor being constrained to rotate with the casing, the cylinder block of the motor being connected to a stator.

4 Claims, 4 Drawing Figures

HYDROSTATIC HYDRAULIC TRANSMISSION

This invention relates generally to a hydraulic hydrostatic transmission, referred to hereinafter as H.H.T., adapted to provide varying speed and torque ratios between a power source and a load.

BACKGROUND OF THIS INVENTION

The well-known conventional hydrostatic hydraulic transmission (H.H.T.) utilizes a fluid such as oil to transmit power from a pump or "input" portion of the transmission to the motor or "output" portion thereof. It typically consists of a positive displacement pump and a positive displacement motor, which can be of various standard types. When a power source such as an engine turns the input shaft, the pump pumps fluid to the motor which in turn rotates the load. Each pump and each motor has its "stator" half to transmit the holding torque to the stationary portion of the transmission during acceleration and deceleration. In some of these conventional transmissions, the "stator" portion is allowed to rotate when not required to provide a "holding" torque.

It is universally recognized that the pumping and motoring of the fluid give rise to internal friction, and represent substantial inefficiencies.

It is also recognized that, although large speed ratios are attained in convention H.H.T.s, high torque ratios over a wide speed range are not feasible. The usual combinations are:

(a) low speed output with high torque ratio;
(b) medium speed output with medium torque ratio;
(c) high speed output with low torque ratio.

In a conventional H.H.T. having a high torque ratio and a wide speed range, the output motor is sized to produce the high starting torque, and the input pump is then sized to match the volumetric capacity required by the output motor. At low speed and high torque, the pump is larger than required, and at high speed and low torque, the motor is larger than required. This results in increased initial costs and weight, as well as inefficiencies in pumping and motoring the fluid.

During deceleration of the load, the input pump reverses its role and becomes a motor, and the output motor also reverses and becomes a pump. For ease of description, the input component will be referred to hereinafter as a pump, and the output component will be referred to hereinafter as a motor.

SUMMARY OF PRIOR ART

The prior art contains the following patents of interest:

U.S. Pat. No. 3,901,031, issued Aug. 26, 1975 to Knapp et al is directed to a control system for an H.H.T.

U.S. Pat. No. 2,562,363, issued July 31, 1951 to Harley E. Nixon is directed to a compound motor for use in an H.H.T.

U.S. Pat. No. 3,643,434, issued Feb. 22, 1972 to Dieter Widmaier is directed to an apparatus that may be used as (a) a compound pump, (b) a compound motor, or (c) an H.H.T. Each pump and each motor has its own stator.

U.S. Pat. No. 3,255,589, issued June 14, 1966 to Heinrich Ebert is directed to an H.H.T. using conventional pumps and motors, each of which has its own stator.

U.S. Pat. No. 1,080,282, issued Dec. 2, 1913 to Charles S. Kellogg is directed to an H.H.T. using conventional pumps and motors. Each pump and each motor has its own stator. When not required, the stators may be allowed to rotate.

U.S. Pat. No. 3,054,263, issued Sept. 18, 1962 to Tadeusz Budzich et al is directed to an H.H.T. using conventional pumps and motors with special automatic control. Each pump and each motor has its own stator.

U.S. Pat. No. 4,458,486, issued July 10, 1984 to Charles H. Baker is directed to an H.H.T. using adjustable wobble plate pumps and motors. Each pump and each motor has its own stator which may be allowed to rotate when not required.

U.S. Pat. No. 3,161,023, issued Dec. 15, 1964 to William Margolin et al is directed to an H.H.T. using an adjustable wobble plate pump and an adjustable swash plate motor. The pump half, made up of the wobble and valve plate, is connected to the input shaft. The pump half, made up of the cylinder block and pistons, is integral with the output shaft and the motor half made up of the cylinder block and pistons. The other half of the motor, comprising the swash and valve plate, is connected to the stator, i.e. the casing.

All of these prior art patents suffer from the disadvantages set forth previously.

GENERAL DESCRIPTION OF THIS INVENTION

In view of the foregoing, it is an aspect of this invention to provide a hydraulic hydrostatic transmission (H.H.T.) having the excellent features of a conventional H.H.T., namely infinitely variable speed ratios and relatively small components, but which will also include a high torque ratio with a wide speed range and a high overall efficiency.

To achieve this, the pump is sized to accommodate the torque provided by the power source. The motor is then sized to produce the portion of load starting torque which is not transferred directly from the pump.

The transmission set forth herein incorporates standard or conventional components for the operation and control of the various parts.

This transmission is free of external leakage of fluid. Any component leakage goes back into the housing which is fitted with a breather and seals at the shafts.

The construction is such that the input shaft is connected to one half of the pump made up of the pump cylinder block and pistons. The other half of the pump, incorporating the swash plate and valve plate, is connected to a rotatable casing which is directly connected to the transmission output shaft. The casing is also directly connected to one half of the output motor, made up of the motor swash plate and valve plate. The other half of the motor, consisting of the cylinder block and pistons, is connected to a stator. When the stator is not in use, i.e. not transmitting a "holding" torque, it may be allowed to rotate with the rotatable casing.

The swash plate and valve plate of the input pump always rotate together with the swash plate and valve plate of the output motor, as all of these components are fixed to rotate with the casing.

More particularly, this invention provides a hydrostatic hydraulic transmission, comprising:
an input shaft,
a stator,
an output shaft and a casing connected to rotate together, a pump having a cylinder block, pistons reciprocable in said block, a valve plate, a swash plate and a yoke for the swash plate, the swash plate, the yoke and the valve plate being constrained to rotate with the casing, the cylinder block being constrained to rotate with the input shaft, and a motor having a cylinder block, pistons reciprocable in said block, a valve plate, a swash plate and a yoke for the last-mentioned swash plate, the swash plate, the yoke and the valve plate of the motor being constrained to rotate with the casing, the cylinder block of the motor being connected to said stator.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
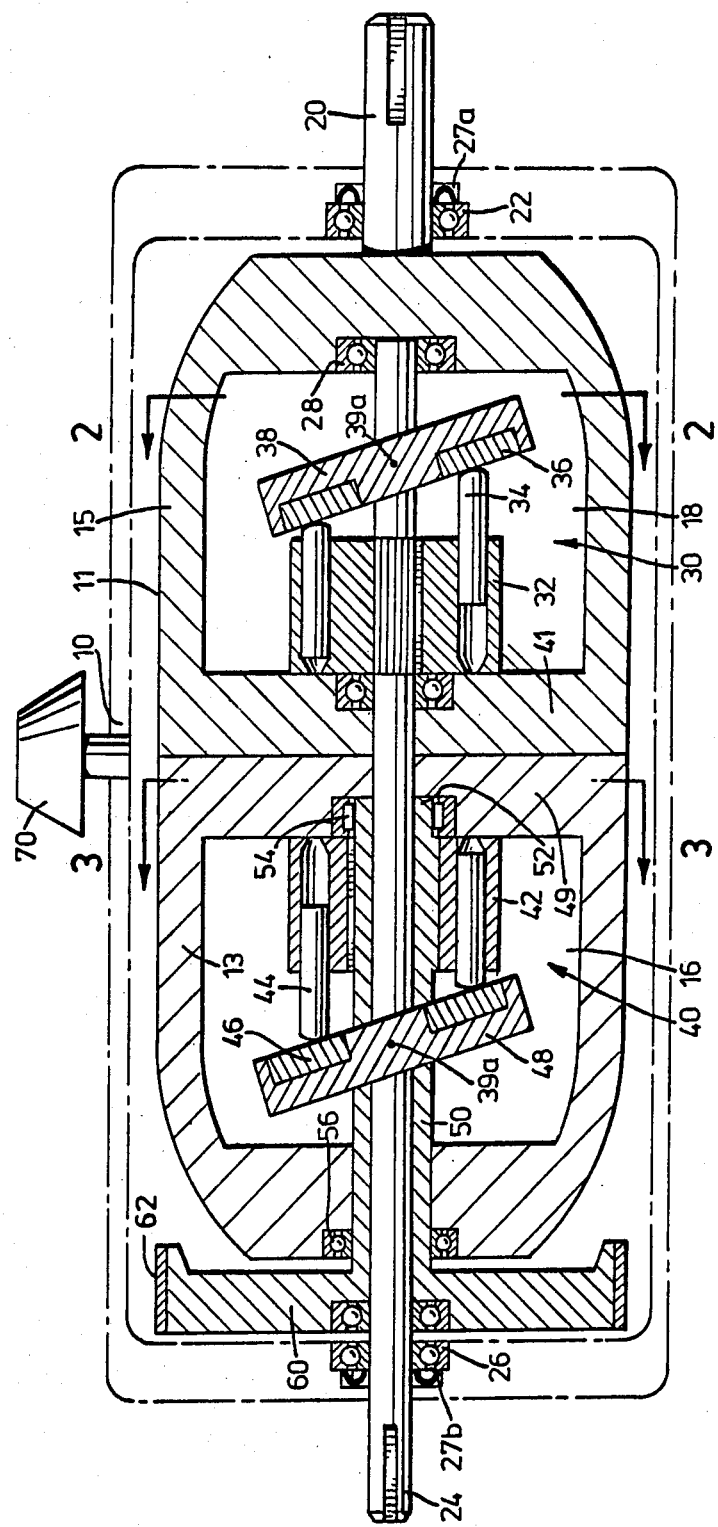
FIG. 1 is an axial sectional view of a hydrostatic hydraulic transmission incorporating the novel features to be described hereinafter.

The axial sectional view of the figure shows in broken lines a stationary housing 10 which surrounds and protects the other components of the transmission, and acts as a fluid reservoir and heat exchanger.

Within the housing 10 is a casing 11, and between these is contained a feed pump, a filter, the stationary portion of a rotary valve, a reversing valve and appropriate piping. All of these latter components are part of the control circuitry, and will be described subsequently with reference to FIG. 4. They have been omitted from FIG. 1, to avoid cluttering the drawing with components that are well known to those skilled in the art.

The casing 11 is made up of two parts 13 and 15, which respectively define chambers 16 and 18. The two parts 13 and 15 are secured together. The rightward part 15 is integral with an output shaft 20, which is supported for rotation by a bearing 22 in the housing 10.

An input shaft 24 is supported for rotation in a bearing 26 also supported by the housing 10 at the opposite end from the bearing 22. Seals 27a and 27b are provided to retain the fluid in the housing 10. As can be seen, the input shaft 24 extends rightwardly and axially through the casing 11, passing through both chambers 16 and 18, and having its rightward end supported for rotation by a bearing 28 in the rightward part 15 of the casing 11. Thus, the input shaft 24 and the output shaft 20 are both coaxial.

Located in chamber 18 within the casing 11 is a pump shown generally at 30, the pump including a cylinder block 32, pistons 34 reciprocable in the block 32, a swash plate 36 and a yoke 38 for supporting the swash plate 36. The swash plate 36 is supported by yoke pins 39, which permit the swash plate 38 to pivot about an axis 39a, seen as a point in FIG. 1 and drawn as a line in FIG. 2. The yoke pins 39 are supported in bosses 39b forming part of the casing 11. A valve plate 41 for the pump is connected to the casing 11 or forms an integral part thereof. As previously stated, the hydraulic elements controlling the angulation of the yoke 38 and the swash plate 36 are not illustrated in FIG. 1.

The cylinder block 32 of the pump 30 is connected to rotate with the input shaft 24, for example with splines. The swash plate 36 and yoke 38 of the pump 30 rotate with the casing 11, due to the connection between the pins 39 and the casing 11.

The chamber 16 in the leftward part 13 of the casing 11 contains a motor 40 which includes a cylinder block 42 and pistons 44 reciprocable in the block 42, as well as a swash plate 46 and a yoke 48 supporting the swash plate 46. The swash plate 46 and its yoke 48 are connected to rotate with the casing 11 through yoke pins identical with the pins 39 shown in FIG. 2, also journalled in bosses forming a part of the casing 11. A valve plate 49 forms part of the motor, and is connected to or integral with the casing 11.

A stator sleeve 50 extends concentrically around the input shaft 24, and has its rightward end 52 supported in a bearing 54 supported in the casing 11. At the left, the sleeve 50 is supported for rotation in a bearing 56 supported at the leftward end of the casing 11. Just to the left of the casing 11, the sleeve 50 is integral with a stator 60 which incorporates brake means 62 by which the stator 60 may either be locked in a stationary position with respect to the housing 10, or allowed to rotate freely when it is not required to provide holding torque.

Within the chamber 16, the cylinder block 42 of the motor 40 is mounted securely to the sleeve 50 as with splines to rotate therewith.

A breather 70 is provided on the housing 10.

The swash plate 36 of the pump 30 is adjustable from a cant of 18° in either direction from a position perpendicular to the input shaft 24. The perpendicular position represents an angulation of zero degrees. This two-way feature for the angulation of the swash plate 36 allows a reversal of fluid flow, and thus a reversal of the rotary direction of the output shaft 20 while the input shaft 24 continues to rotate in the same direction. The swash plate 46 of the motor 40 is adjustable from a position perpendicular to the input shaft 24 (zero degrees) to a cant of 18°.

A feature of this design is that the displacement of the motor 40 may be much greater than that of the pump 30, giving the required overall torque ratio.

The apparatus just described is capable of the following operational modes.

In a first mode, the power source turns the input shaft 24, while the output shaft 20 does not rotate. The pump swash plate 36 would be at zero setting and the motor swash plate 46 could be at any angle, resulting in zero fluid flow and thus no energy transmitted from the input shaft 24 to the output shaft 20. To eliminate "creep" in this mode, the stator brake means 62 could be released, allowing the stator 60 to rotate.

In a second mode, the power source turns the input shaft 24, with the output shaft 20 turning at synchronous speed with the input shaft 24. In this case, the pump swash plate 36 is at full or partial setting, and the motor swash plate 46 is at zero angle. Again there would be zero fluid flow, and the torque energy in the input shaft 24 would be fully transmitted directly to the output shaft 20 at a one-to-one ratio. This arises because the two halves of the pump 30 must turn together since no fluid can be pumped to the motor. It follows that, with the transmission in the forward mode at a one-to-one ratio, there are no frictional losses due to the pumping and motoring of fluid. This results in a very high efficiency in the forward synchronous mode. In this mode, the stator could be held stationary for some applications and could be allowed to rotate for other applications.

Of course, there are an infinite number of pump and motor settings that could be selected. As an example, the following setting would represent an intermediate ratio. The input pump swash plate 36 is at full setting in the forward mode, and the motor swash plate 46 is set to give the motor twice the displacement of the pump. This results in an input to output overall torque ratio of 1 to 3, and inversely, a speed ratio of 3 to 1. In this mode, the stator must be held stationary to create positive ratios of speed and torque.

From the description given above, it will be evident that this construction yields torque ratios and efficiencies which are much greater than in conventional hydrostatic transmissions. In addition, the components required are smaller to achieve comparable torque ratios.

The transmission just described may be thought of as a transmission with an infinite number of ratios, with every shift change lying on the load speed-torque curve. Thus, the corner horsepower capacity of this transmission will match the corner horsepower of the load requirement.

It will thus be appreciated that, although the present design utilizes the well known conventional hydraulic hydrostatic pump and motor and the typical control components, these are arranged to form a novel type of transmission in which the input pump has no "stator" half. Half of the input pump is connected directly to and is part of the output shaft of the transmission, while the other pump half is connected to the input shaft of the transmission and hence to a power source. One half of the output motor is connected directly to and is part of the output shaft of the transmission, while the other half of the output motor is connected to a stator. This stator may be allowed to rotate when it is not transmitting a holding torque, for example when idling or at synchronous speeds of input and output shafts.

When the load is stopped with the power source at low speed, the input pump setting is at zero displacement, and the output motor setting is at any displacement. When low speed-high torque is required, the input pump setting is small while the output motor setting is at full displacement. When high speed-low torque is required at the output shaft, the output motor setting de-strokes to zero as the input and output shafts come to synchronized speed. At this time, the power source energy is transferred directly from the input shaft to the output shaft and load through the two halves of the pump, and thus no fluid is flowing although the fluid is under pressure and is in equilibrium. The fact that no fluid is flowing eliminates inefficiencies due to pumping and motoring fluid.

Control

The control for the transmission described hereinabove will vary for each application.

The main "closed" circuit for the pump and motor with its interconnected valves, including the feed pump circuit, is a standard, well-known circuit. The pump and motor actuating cylinder circuits have been added as a simple control scheme. In some applications, other speed and pressure controls could be added which will not alter the basic concept of this invention.

Figure 4:
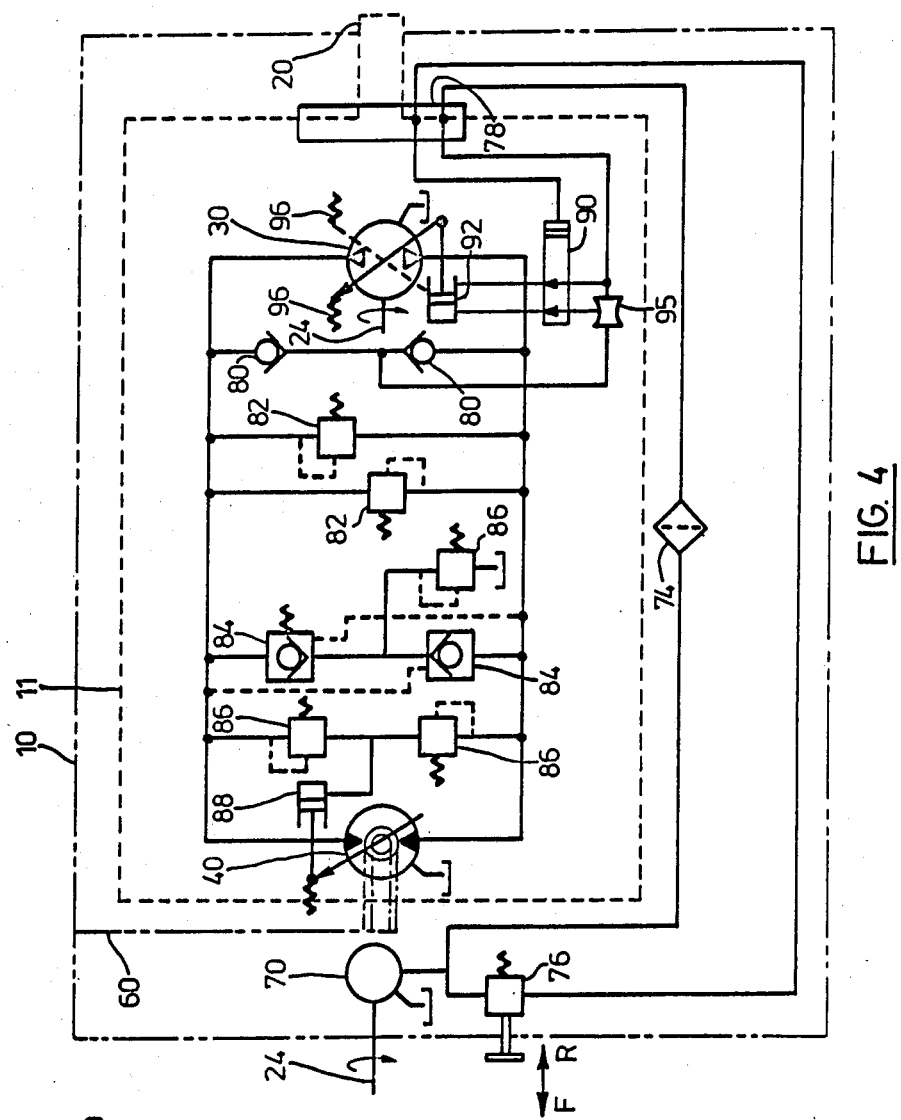
FIG. 4 is a schematic view showing the control circuitry for the transmission of this invention.

In the embodiment illustrated in FIG. 4, the control incorporates standard hydraulic components. All of the components located within the casing 11 must be dynamically balanced about the center of rotation. Also, it will be understood that although one motor actuating cylinder is shown, two or more may be utilized.

Referring to FIG. 4, the following components are located inside the housing 10 and outside the casing:
  (1) A feed pump 70 driven by the transmission input shaft and located between the left side of the housing and the stator. The feed pump 70 replenishes the closed system with fluid lost through pump and motor slip, and it provides control fluid.
  (2) A filter 74.
  (3) A manual reversing valve 76.

Fluid to the feed pump 70 is supplied from the housing 10 and is transmitted to the casing 11 through a rotary valve 78. Fluid from the reversing valve 76 is also supplied to the casing through the rotary valve 78.

Figure 2:
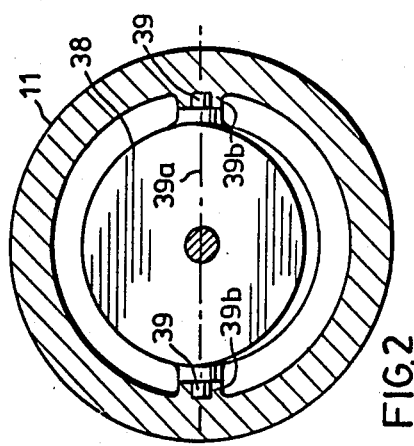
FIG. 2 is a cross-sectional view showing either of two swash plates and the adjacent casing, taken when the swash plate is oriented perpendicularly to the axis of the casing (sections A—A and B—B in FIG. 1)
Figure 3:
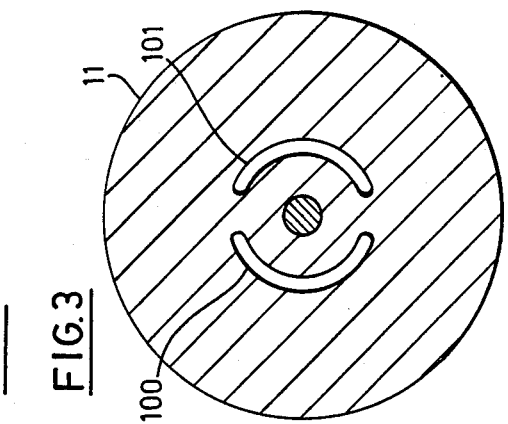
FIG. 3 is a sectional view taken at the line C—C in FIG. 1.

Kidney-shaped passages 100 and 101 (see FIG. 3) constituting supply lines for the pump and motor extend through the valve plates 41 and 49 (FIG. 1). One of the passages is a pump discharge passage and a motor intake passage, and the other is the pump intake and motor discharge.

Located between the kidney-shaped passages 100 and 101 are the following:
  (1) Back-to-back check valves 80 to supply make up fluid to the appropriate low pressure side.
  (2) Crossover relief valves 82 to limit the system fluid pressure in either supply line due to shock loading.
  (3) Pilot operated check valves 84, and a charge relief valve 86 to bypass excess feed pump flow.
  (4) Pressure operated valves 86 to supply fluid to the motor swash plate actuator cylinder 88 from the appropriate pressure line.

Fluid from the manual reversing valve 76 is supplied to the main pump reversing valve 90 inside the casing 11 through the rotary valve 78. When the fluid to the pump actuating cylinder 92 is reversed, the pump swash plate turns about the yoke pins 39 in the opposite direction, reversing the fluid flow and reversing the transmission output shaft 20.

Fluid from the feed pump 70 passes through a venturi 95 ahead of the back-to-back check valves 80. Fluid to operate the main pump actuating cylinder 92 is taken from the high pressure side of the venturi 95 and from the throat (low pressure) area of the venturi 95.

At low input shaft speed, the pressure differential acting on the pump activating piston is small, allowing the return springs 96 to center the pump swash plate 36. As the input shaft speed increases, the pressure differential across the venturi 95 becomes greater, causing the actuating piston to stroke the pump swash plate toward full displacement.

It will be appreciated that, although the output shaft 20 has been shown as integrally coaxial with the casing 11, an alternative construction would be one in which a main gear were affixed to or integral with the casing 11 and coaxial therewith, with an output shaft having a smaller gear meshing with the main gear. This would provide an output with a higher speed and lower torque than the embodiment shown in FIG. 1, and could be useful in certain circumstances.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. A hydrostatic hydraulic transmission, comprising:
an input shaft,
a stator,
an output means and a casing connected to rotate together,
a pump having a cylinder block, pistons reciprocable in said block, a valve plate, a swash plate and a yoke for the swash plate, the swash plate, the yoke and the valve plate being constrained to rotate with the casing, the cylinder block being constrained to rotate with the input shaft, and
a motor having a cylinder block, pistons reciprocable in said block, a valve plate, a swash plate and a yoke for the last-mentioned swash plate, the swash plate, the yoke and the valve plate of the motor being constrained to rotate with the casing, the cylinder block of the motor being connected to said stator.

2. The invention claimed in claim 1, in which the input shaft and output means are coaxial, the casing being substantially radially symmetrical about the shaft axis and having two chambers longitudinally adjacent one another, the input shaft entering the casing from one end and extending to the chamber remote from said one end, the latter chamber containing the pump, the other chamber containing the motor, the cylinder block of the motor being connected to the stator through a sleeve coaxially surrounding the input shaft and passing out of the casing at the end adjacent said other chamber, the stator being located adjacent said last-mentioned end.

3. The invention claimed in claim 2, further comprising an outer stationary housing, and means for selectively locking the stator with respect to the housing or releasing the stator to rotate with respect to the housing.

4. The invention claimed in claim 1, in which the output means is an output shaft.

* * * * *